United States Patent [19]

Agoston

[11] Patent Number: 4,748,379
[45] Date of Patent: May 31, 1988

[54] ARRANGEMENT IN A TUNABLE MAGNETRON

[75] Inventor: Andras Agoston, Täby, Sweden

[73] Assignee: U.S. Philips Corporation, New York, N.Y.

[21] Appl. No.: 839,018

[22] Filed: Mar. 12, 1986

[30] Foreign Application Priority Data

Mar. 21, 1985 [SE] Sweden .............................. 8501399

[51] Int. Cl.$^4$ ............................................ H01J 25/50
[52] U.S. Cl. ................................ 315/39.55; 315/39.59; 315/39.61
[58] Field of Search ................. 315/39.55, 39.59, 39.61

[56] References Cited

U.S. PATENT DOCUMENTS

| | | | |
|---|---|---|---|
| 3,297,909 | 1/1967 | Foreman et al. ............ | 315/39.59 X |
| 3,379,925 | 4/1968 | Edwards .......................... | 315/39.59 |
| 3,564,340 | 2/1971 | Bahr ................................ | 315/39.61 |
| 3,599,035 | 8/1971 | Frerichs et al. ................. | 315/39.59 |
| 3,671,801 | 6/1972 | Masek .............................. | 315/39.59 |

Primary Examiner—Saxfield Chatmon

Attorney, Agent, or Firm—Algy Tamoshunas; Brian J. Wieghaus

[57] ABSTRACT

Figure 3:
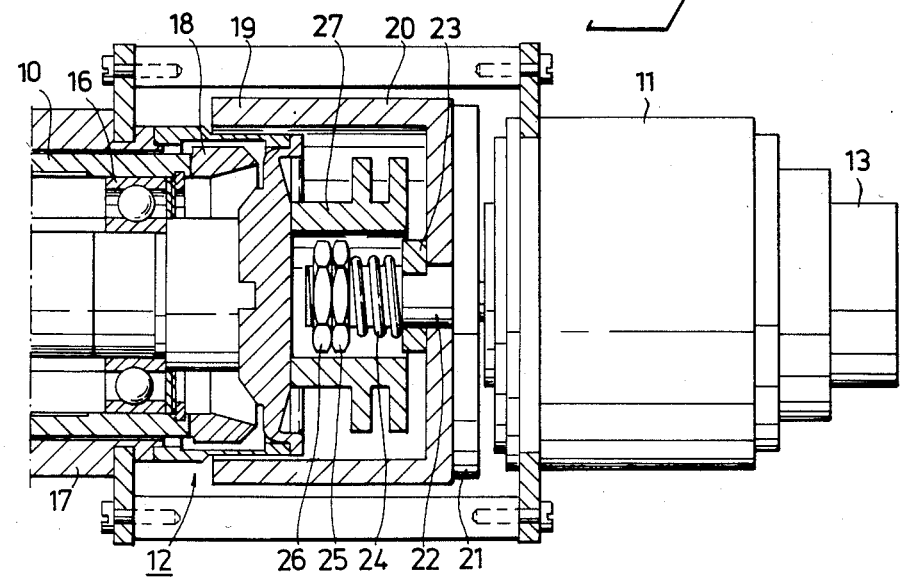

The invention relates to a tunable magnetron comprising a rotatable tuning element (10) projecting into a ring shaped interaction space between coaxially arranged cathode and anode systems. The tuning element (10) is driven by an electric motor (11) and produces upon rotation a periodic variation of the tuning. The tuning element (10) is situated within the evacuated space of the magnetron and the motor (11) in situated outside said space. The drive torque of the motor is then transferred to the tuning element via a coupling (12) having two active parts situated one on each side of the evacuated envelope (17) of the magnetron. Such a coupling can only transfer a limited torque. According to the invention the magnetron comprises means for limiting the torque which can be transferred to the coupling (12), both upon starting and stopping, for example a torque limiter (21-26) between the motor (11) and the coupling (12), whereby the start and stop procedures can be performed with optimum torque. Therefore starting and stopping of the tuning element (10), for example when switching between different fixed frequencies, can be made with maximum speed (FIG. 3).

10 Claims, 1 Drawing Sheet

ARRANGEMENT IN A TUNABLE MAGNETRON

The invention relates to an arrangement in a tunable magnetron. The magnetron comprises coaxial cathode and anode systems defining between themselves a ring shaped interaction space, which is evacuated during operation, and a rotatable tuning element with an active portion influencing the tuning of the magnetron by having around the circumference varying electric conductivity for producing a periodic variation of the tuning upon rotation of the turning element, The tuning element is situated within an evacuated space enclosed by a vacuum-tight envelope and driven by an electric motor situated outside the vacuum-tight envelope via a coupling having two active parts situated on each side of the vacuum-tight envelope. The magnetron furthermore comprises a brake or stop device influencing the motor shaft.

Such a magnetron is for example described in SE-patent 191 373, to which U.S. Pat. No. 3,343,031 corresponds. It may for example be used for producing HF-pulses whose frequency varies from pulse to pulse but also, by means of the brake or stop device, for producing HF-pulses having a fixed frequency.

In certain applications it is a great advantage if a transition from a mode with generation of pulses having varying frequency to a mode with generation of pulses having fixed frequency and vice versa can be effected as quickly as possible in a simple, reliable and cheap manner.

In known constructions the time for the transition is in general relatively extended.

The object of the invention is to achieve a very short time of transition from the generation of HF-pulses having varying frequency to the generation of pulses having fixed frequency and vice versa, or in other words a very short stopping or starting time for the tuning element in a tunable magnetron of the described kind.

The difficulties in achieving short stop and start times depend upon the fact that the coupling, usually a magnetic coupling, between the tuning element and the drive motor only can transfer a limited torque. If this torque is exceeded, i.e. if the coupling loses its grip in a braking operation, there will be an uncontrolled brake action and a long stopping time. If the coupling loses its grip upon starting, the tuning element cannot be accelerated up to its operating speed.

In constructions known until now small motors have been used, the driving torque of which is essentially below the torque which can be transferred by the magnetic coupling. With such an arrangement both the stopping time and the starting time will be unnecessarily extended. The stopping procedure is further complicated or extened by the necessity to electronically sense or wait for the stationary condition of the tuning element before a possible magnetic brake is made effective.

The invention eliminates these disadvantages and offers the advantage to shorten the stopping and starting times radically.

The characteristics for a magnetron according to the invention is that it comprises, in both directions effective, means for limiting the torque which can be transferred to that part of the coupling, which is situated outside the vacuum-tight envelope, and that the limited torque which can be transferred to the coupling is adjusted to a value lying just below the maximal torque which can be transferred by the coupling.

In one embodiment of the invention, the means comprises a torque limiter arranged between the motor and the coupling. This embodiment has the advantage that both the brake or stop device and the motor can deliver unlimited torques during the stopping or starting procedure.

The torque limiter can be a purely mechanical frictional coupling or the like. Alternatively it may be of electro-magnetic nature, in which case the torque is adjusted electrically.

In another embodiment of the invention, the means consists therein that the magnetic brake influencing the motor has an adjustable brake torque. This solution can suitably be combined with the use of an electric motor delivering a maximum torque which is just below the maximum torque which can be transferred by the coupling.

Figure 1:
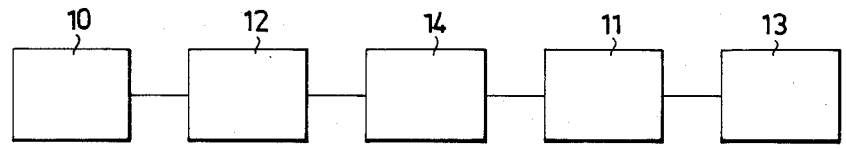
Figure 2:
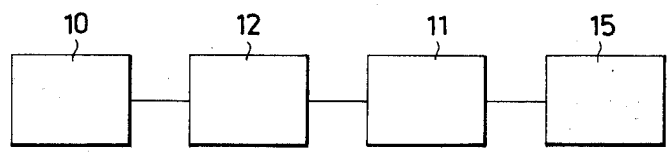

The invention will now be illustrated by way of example with reference to the attached drawing, in which FIGS. 1 and 2 show two block diagrams for two principally different embodiment of the invention, and FIG. 3 shows a side view, partly in section, of part of a magnetron with a mechanical frictional clutch used as torque limiter in an arrangement embodying the invention.

In FIGS. 1 and 2 block 10 represents a tuning element which is embodied in a continuously tubable magnetron, block 11 is an electric motor for driving the tuning element 10, and block 12 is a magnetic coupling. The tuning element 10 is situated within an evacuated space communicating with the interaction space of the magnetron, while the drive motor 11 is situated outside the space, the magnetic coupling 12 being used to produce coupling between the motor 11 and the tuning element 10 via the vacuum-tight envelope of the magnetron. The magnetic coupling 12 is then only able to transfer a given maximum torque.

The magnetron may be example be of a construction as described in SE-patent 191 373 while the magnetic coupling may be constructed as described in SE-patent 199 364, which corresponds to U.S. Pat. No. 3,247,421.

In the embodiment depicted in FIG. 1, a magnetic brake 13 is arranged on the drive shaft of the motor 11 and a torque limiter 14 is introduced between the motor 11 and the magnetic coupling 12. The magnetic brake 13 in FIG. 1 can deliver an unlimited brake torque.

The torque limiter 14 may be a frictional clutch of purely mechanical construction. Alternatively it may be an electro-mechanical or electro-magnetic device, in which case the transferable torque is controlled electrically. The torque which can be transferred by the torque limiter 14 is adjusted so that it is just below the maximum torque which can be transferred by the magnetic coupling 12.

Such a torque limiter 14 is normally also active upon starting the motor, when the tuning element is accelerated to its final speed in the operating condition. The drive torque delivered by the motor therefore in this case does not need to be limited.

In the embodiment depicted in FIG. 2, a magnetic brake 15 having an adjustable torque is arranged on the drive shaft of the motor 11, which in this case is rigidly connected to the magnetic coupling 12. The brake torque delivered by the magnetic brake 15 is then adjusted to a value which is just below the maximum transferable torque of the magnetic coupling 12. In this case the motor should be of a type allowing setting of a maximum torque, this maximum torque also being adjusted to a value just below the maximum transferable torque of the magnetic coupling 12.

FIG. 3 shows a side view, partly in section, of that part of a tunable magnetron, where the magnetic coupling 12 and drive motor 11 with magnetic brake are situated, a mechanical frictional clutch used as a torque limiter in accordance with the invention being shown in detail. In FIG. 3 the tuning element 10, the magnetic coupling 12, the drive motor 11 and the magnetic brake 13 are shown. The tuning element 10 is supported by ball bearings, one ball bearing 16 is visible in FIG. 3, and is situated within an evacuated envelope 17. The tuning element 10 is terminated by a part 18 cooperating with a part 19 of a yoke 20 situated outside the envelope; the parts 18 and 19 are made of magnetic material and together form the magnetic coupling 12.

In according with the invention the yoke 20 of the magnetic coupling 12 is connected to the drive shaft of the motor 11 via a frictional coupling consisting of the following parts: pressure plate 21 with hub 22, washer 23, compression spring 24, setting nut 25 and locking nut 26. The pressure plate 21 and hub 22 are rigidly connected to the drive shaft of the motor 11, while the yoke 20 is free to rotate on the hub 22 and the washer 23 is axially displaceable on the hub but locked for rotation relative to the hub. The compression spring 24 acts between the setting nut 25 and the washer 23 and presses the central part of the yoke 20 between the washer 23 and the pressure plate 21, whereby upon rotation of the motor shaft the yoke 20 will be carried along due to friction against surrounding parts.

The maximum transferable torque of the frictional coupling can be set accurately by means of the setting nut 25, which is locked by means of the locking nut 26.

A cooling element 27 with cooling flanges is in heat conductive contact with the envelope of the magnetron in order to lead away exessive heat.

In another embodiment an electro-magnetic shaft-clutch is used as torque limiter, the maximum transferable torque of which can be controlled electrically.

Other types of torque limiters can alternatively be used, for example hydro-mechanical or pneumatic devices.

What is claimed is:

1. An arrangement in a tunable magnetron comprising coaxial cathode and anode systems defining between themselves a ring shaped, in operation evacuated, interaction space and a rotatable tuning element comprising an active part influencing the tuning of the magnetron, which element is situated within an evacuated space enclosed by a vacuum-tight envelope and is driven by an electric motor situated outside the vacuum-tight envelope via a coupling having two active parts situated one on each side of the vacuum-tight envelope, and furthermore comprising a brake or stop device acting on the motor shaft, characterized in that it has means for limiting the torque transferred to that part of the coupling which is situated outside the vacuum-tight envelope from the motor to a value which is just below the maximum torque which can be transferred by the coupling.

2. An arrangement as claimed in claim 1, characterized in that the said means comprises a torque limiter arranged between the motor and the coupling.

3. An arrangement as claimed in claim 2, characterized in that the torque limiter is of mechanical type, for example a frictional clutch.

4. An arrangement as claimed in claim 2, characterized in that the electric motor produces a maximum torque having a value just below the maximum torque which can be transferred by the coupling.

5. In a tunable magnetron assembly having a rotatable tuning element within an evacuated space of the magnetron, a rotatable coupling element external to the evacuated space for coupling torque up to a maximum value to said tuning element to rotate said tuning element and tune said magnetron by rotation of said coupling element, said coupling element and said tuning element decoupling if a torque greater than said maximum torque value is applied to said coupling element, and a motor operable for rotating said coupling element to tune said magnetron, the improvement comprising: torque limiting means for limiting the torque transferred from said motor to said coupling element to a value less than the maximum torque which said coupling element can transfer to prevent said coupling and tuning elements from decoupling if the torque delivered by said motor exceeds said maximum torque value.

6. In a tunable magnetron assembly according to claim 5, said tuning element and said coupling element together comprising means for magnetically coupling to each other, and rotation of said coupling element being effective to transfer torque to and rotate said tuning element.

7. In a tunable magnetron assembly according to claim 6, said torque limiting means being effective to frictionally couple torque developed by said motor to said coupling element and to permit slippage when the torque developed by said motor exceeds said maximum torque value.

8. In a tunable magnetron assembly according to claim 7, said torque limiting means includes adjustment means external to the magnetron evacuated space for permitting adjustment of the limit value of the torque transferred to said coupling element.

9. In a tunable magnetron assembly according to claim 6, said torque limiting means includes adjustment means external to the magnetron evacuated space for permitting adjustment of the limit value of the torque transferred to said coupling element.

10. In a tunable magnetron assembly according to claim 5, said torque limiting means includes adjustment means external to the magnetron evacuated space for permitting adjustment of the limit value of the torque transferred to said coupling element.

* * * * *